(12) United States Patent
Arya et al.

(10) Patent No.: US 6,785,094 B2
(45) Date of Patent: Aug. 31, 2004

(54) WELD FREE HIGH PERFORMANCE LAMINATE SUSPENSION

(75) Inventors: Satya Prakash Arya, San Jose, CA (US); Tzong-Shii Pan, San Jose, CA (US); Surya Pattanaik, San Jose, CA (US); Victor Wing Chun Shum, San Jose, CA (US)

(73) Assignee: Hitachi Global Storage Technologies (NL)

( * ) Notice: Subject to any disclaimer, the term of this patent is extended or adjusted under 35 U.S.C. 154(b) by 136 days.

(21) Appl. No.: 10/131,553

(22) Filed: Apr. 24, 2002

(65) Prior Publication Data

US 2003/0202283 A1 Oct. 30, 2003

(51) Int. Cl.[7] .............................. G11B 5/48; G11B 21/21
(52) U.S. Cl. ................................ 360/244.3; 360/244.9; 360/245.5; 360/245.9
(58) Field of Search .......................... 360/244.2, 244.3, 360/244.5, 244.8, 244.9, 245, 245.2, 245.3, 245.5, 245.8, 245.9; 428/138, 172, 209

(56) References Cited

U.S. PATENT DOCUMENTS

| | | | |
|---|---|---|---|
| 5,630,948 A | 5/1997 | Ueda et al. ................... 216/20 |
| 5,680,274 A | 10/1997 | Palmer ....................... 360/104 |
| 5,737,152 A | 4/1998 | Balakrishnan ............... 360/104 |
| 5,862,010 A * | 1/1999 | Simmons et al. ........ 360/97.01 |
| 5,864,445 A | 1/1999 | Bennin et al. .............. 360/104 |
| 5,955,176 A | 9/1999 | Erpelding et al. .......... 428/209 |
| 5,956,209 A | 9/1999 | Shum ......................... 360/104 |
| 5,969,906 A | 10/1999 | Arya et al. .................. 360/104 |
| 5,986,853 A | 11/1999 | Simmons et al. ........... 360/104 |
| 6,091,578 A | 7/2000 | Stole et al. ................. 360/106 |
| 6,215,622 B1 * | 4/2001 | Ruiz et al. ............... 360/244.3 |
| 6,229,673 B1 * | 5/2001 | Shinohara et al. ....... 360/246.2 |
| 6,381,099 B1 * | 4/2002 | Mei ......................... 360/244.3 |
| 6,442,828 B1 * | 9/2002 | Albrecht et al. .......... 29/603.03 |
| 6,533,950 B1 * | 3/2003 | Shum et al. ................... 216/13 |
| 6,596,184 B1 * | 7/2003 | Shum et al. ................... 216/13 |
| 6,600,631 B1 * | 7/2003 | Berding et al. .......... 360/244.3 |
| 6,636,382 B2 * | 10/2003 | Shiraishi .................. 360/244.3 |
| 2002/0181155 A1 * | 12/2002 | Takagi et al. ............ 360/244.3 |
| 2003/0007289 A1 * | 1/2003 | Shiraishi .................. 360/244.3 |
| 2003/0202285 A1 * | 10/2003 | Arya et al. ............... 360/244.3 |
| 2003/0206376 A1 * | 11/2003 | Erpelding et al. ........ 360/245.9 |

* cited by examiner

Primary Examiner—Jefferson Evans
(74) Attorney, Agent, or Firm—Walter W. Duft (57) ABSTRACT

A suspension assembly is designed to carry a slider and read/write head elements in a magnetic data storage device. The suspension assembly is formed from a composite laminate structure that includes first, second, third, fourth and fifth material layers. The layers are arranged such that the second layer is disposed between the first and third layers, and the fourth layer is disposed between the third and fifth layers. The laminate structure is configured using a suitable removal process, such as partial chemical etching, to define a mount plate, a hinge, a load beam functional end, and an electrical lead system. The laminate structure may be further formed with a flexure gimbal system that comprises the third, fourth and fifth layers.

30 Claims, 6 Drawing Sheets

WELD FREE HIGH PERFORMANCE LAMINATE SUSPENSION

BACKGROUND OF THE INVENTION

1. Field of the Invention

The present invention relates to data storage apparatus for magnetically reading and writing information on data storage media. More particularly, the invention concerns the fabrication of suspension assemblies designed to carry read/write heads in magnetic disk drive storage devices.

2. Description of the Prior Art

By way of background, a read/write head in a magnetic disk drive storage device ("disk drive") is typically incorporated on an air bearing slider that is designed to fly closely above the surface of a spinning magnetic disk medium during drive operation. The slider is mounted to the free end of a suspension that in turn is cantilevered from the arm of a pivotable actuator. When energized, the actuator sweeps the actuator arm and the cantilevered suspension across the disk surface, allowing the read/write head to read and write data in a series of concentric tracks.

The suspension of a conventional disk drive typically includes a relatively stiff load beam whose base end (known as the "mount plate") is attached to the actuator arm and whose free end (known as the "functional end") mounts a flexure that carries the slider and its read/write head. Disposed between the mount plate and the functional end of the load beam is a "hinge" that is compliant in the vertical bending direction (normal to the disk surface). The hinge enables the load beam to suspend and load the slider and the read/write head toward the spinning disk surface. It is then the job of the flexure to provide a gimbaled support for the slider so that the read/write head can pitch and roll in order to adjust its orientation for unavoidable disk surface run out or flatness variations.

The foregoing suspension components are quite small. A typical suspension is about 18 mm in length. The load beam typically has a thickness of between about 0.03–0.1 mm and the flexure typically has a thickness of between about 0.02–0.03 mm. The slider is typically about 1.25 mm long x 1.00 mm wide x 0.30 mm thick, and the read/write head carried thereon is a fraction of that size.

A design requirement of a disk drive suspension is that it be sufficiently compliant in the vertical bending direction to facilitate proper gram loading of the slider and the read/write head relative to the supportive air bearing force. At the same time, the suspension must be relatively stiff in the horizontal direction (parallel to the disk surface) to prevent off-track sway misalignment. It must also be torsionally stiff to prevent off-track rotational misalignment. In addition to these static structural requirements, the suspension must have good dynamic characteristics to prevent unwanted vibration and flutter. Excessive gain caused by resonance at critical dynamic frequencies can induce unwanted torsion, sway and bending displacements, all of which can contribute to track misalignment problems, excessive noise, and undue wear. Dynamic design considerations have become particularly acute as TPI (Tracks Per Inch) recording density requirements continue to increase. This has necessitated higher track servoing bandwidths, which in turn has established a need for higher dynamic performance suspensions.

Historically, disk drive suspensions have been fabricated using welding processes. In some load beam designs, for example, a single sheet of stainless steel has stainless steel pieces welded to it to develop the required thicknesses for the mount plate and the functional end. The hinge is defined by the initial sheet material that lies between the welded pieces. In other load beam designs, the mount plate, the hinge and the functional end are assembled from three different pieces of stainless steel sheet stock that are welded together. The flexure portion of the suspension also entails welding. In particular, welds are normally used to attach the flexure to the load beam.

A disadvantage of welded suspension designs is that welding requires an additional processing cycle that includes fixturing and multiple processing steps. Welding can also introduce thermal distortions at the weld points. This leads to flatness variations relative to the principal plane of the component parts. Flatness is an important parameter to control because a non-flat suspension can cause suspension flutter due to air flow at operational disk rotation speeds. Welding also tends to reduce the real estate available for components such as piezoelectric milliactuators or the like. There are also free vibrating lengths of material between the weld points that contribute to dynamic flutter and mode gains at critical frequencies, thereby adversely affecting performance. Fixturing will introduce additional alignment tolerance.

Accordingly, there is a need for improvement in the design and manufacture of disk drive suspensions. What would be particularly desirable is a suspension that is substantially, if not completely, weld free in its construction.

SUMMARY OF THE INVENTION

The foregoing problems are solved and an advance in the art is obtained by an improved method of manufacturing a suspension designed to carry a read/write head in a data storage device. According to preferred implementations of the invention, a weld free suspension is formed from a composite laminate structure that includes a first, second, third, fourth and fifth material layers. The layers are arranged such that the second layer is disposed between the first and third layers, and the fourth layer is disposed between the third and fifth layers.

The laminate structure is configured using a suitable removal process, such as chemical etching, to define a mount plate, a hinge, a load beam functional end, and an electrical lead system. The mount plate preferably comprises at least the first, second and third layers, and may also include the fourth and fifth layers. The load beam functional end preferably comprises at least the third, fourth and fifth layers, and may also include the first and second layers. The hinge represents an area between the mount plate and the load beam that can be defined by removing all or part of the first and second layers. The electrical lead system is preferably defined by first portions of the fifth layer that are created by removing second portions of the fifth layer.

The laminate structure can be further formed with a flexure gimbal system that comprises only the third, fourth and fifth layers. The flexure gimbal system may include a slider attachment area and gimbaling flexure members formed from the third layer.

A variety of materials can be used to form the layers of the laminate structure. For example, the first layer can be made from a material selected from the group consisting of structural load bearing materials, including but not limited to stainless steel, copper, and glass/ceramic materials. The second layer can be made from a material selected from the group consisting of electrically insulating materials, electrically conductive materials and damping materials, including but not limited to polyimides, copper, aluminum, and viscoelastic polymers. The third layer can be made from a material selected from the group consisting of structural load bearing materials, including but not limited to stainless steel and copper. The fourth layer can be made from a material selected from the group consisting of electrically insulating materials and damping materials, including but not limited to polyimides and viscoelastic polymers. The fifth layer can be made form a material selected from the group consisting of electrically conducting materials, such as copper.

The invention further contemplates a suspension assembly comprising a suspension constructed according to the inventive method in combination with a transducer-carrying slider, and a disk drive incorporating the suspension assembly.

BRIEF DESCRIPTION OF THE DRAWING

The foregoing and other features and advantages of the invention will be apparent from the following more particular description of preferred embodiments of the invention, as illustrated in the accompanying Drawing, in which.

DETAILED DESCRIPTION OF PREFERRED EMBODIMENTS

Figure 1:
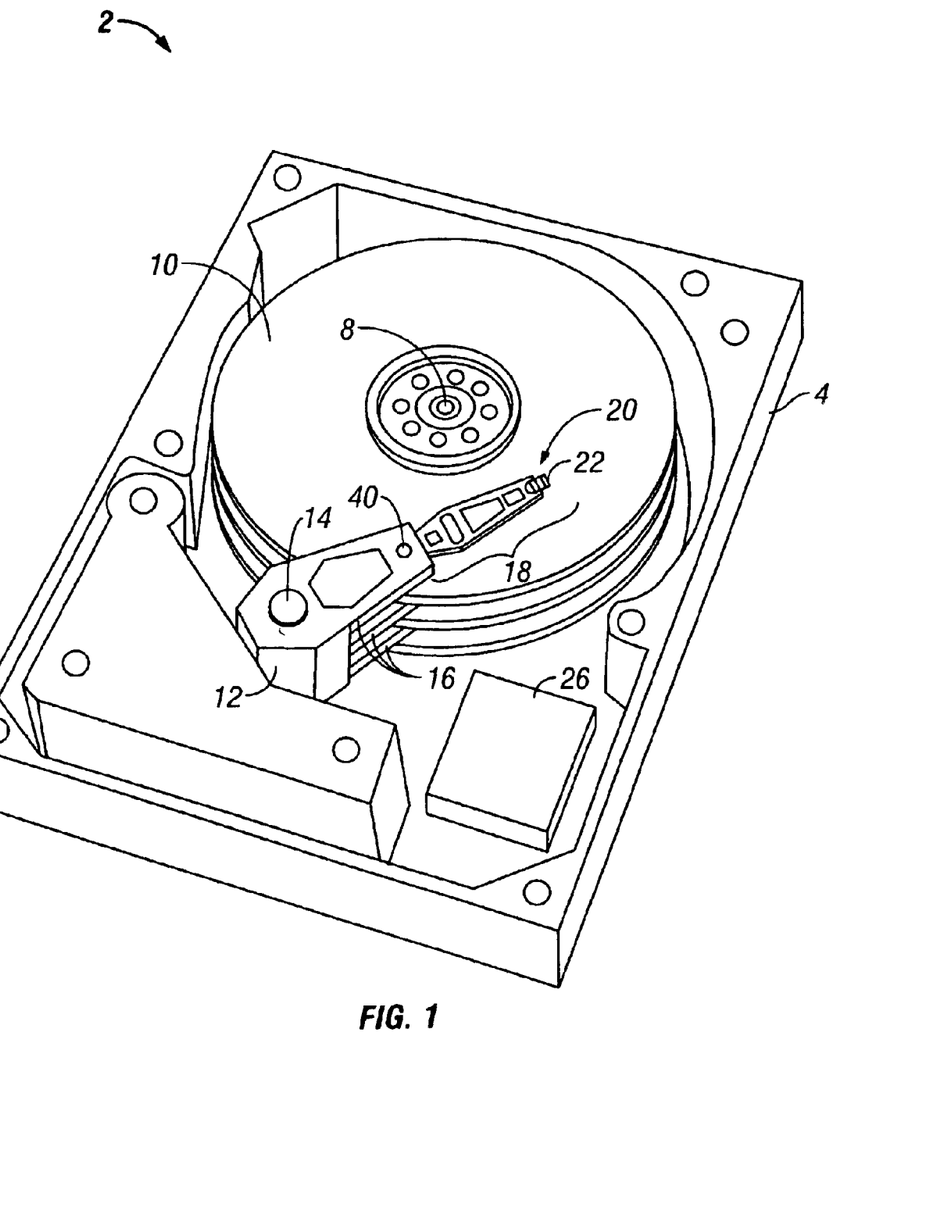
FIG. 1 is an interior perspective view of a magnetic disk drive that incorporates a read/write head suspension fabricated in accordance with the invention.
Figure 2:
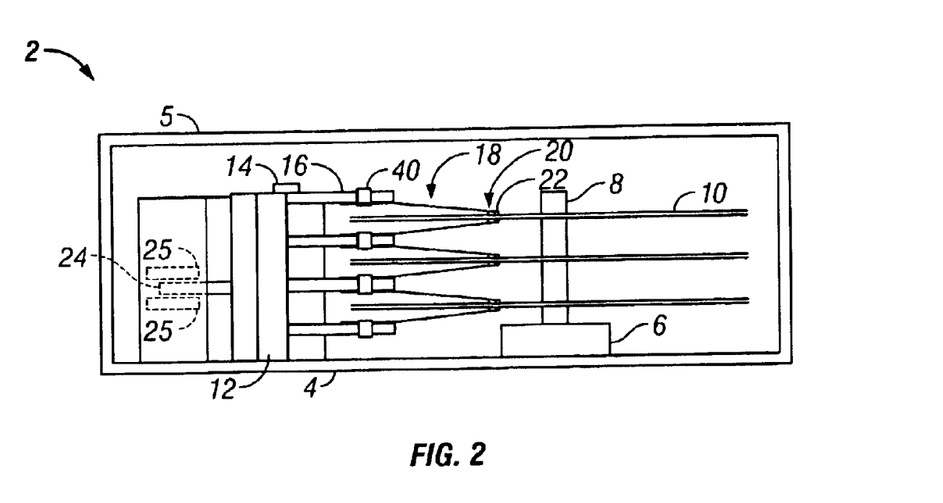
FIG. 2 is a simplified vertical sectional view of the magnetic disk drive of FIG. 1.
Figure 3:
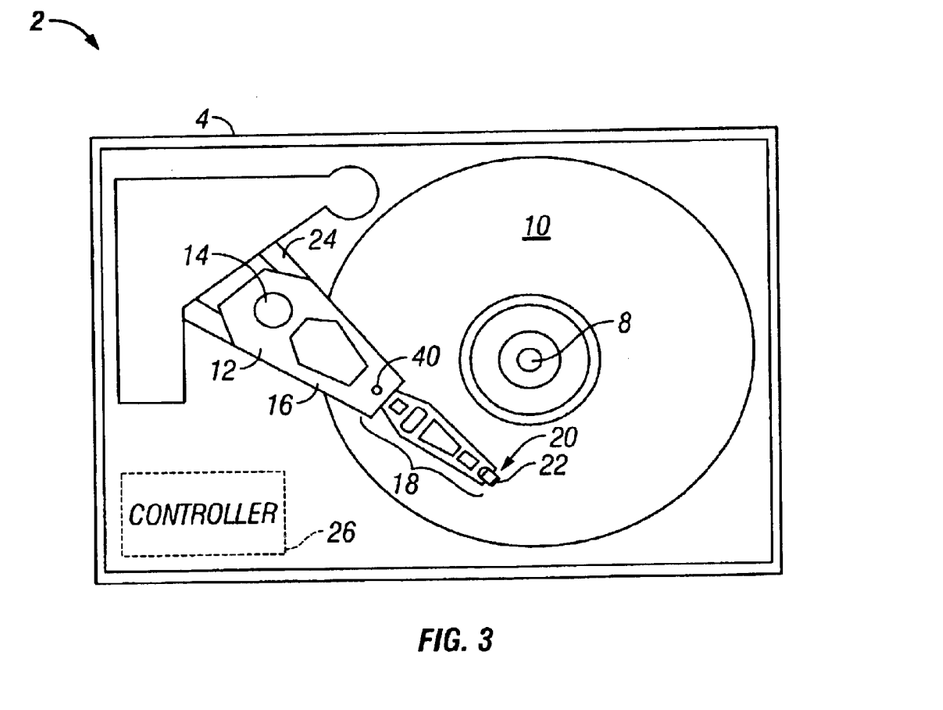
FIG. 3 is a simplified horizontal sectional view of the disk drive of FIG. 1.

Turning now to the figures, wherein like reference numerals represent like elements in all of the several views, FIGS. 1–3 illustrate a disk drive 2 having a suspension (described below) that has been manufactured in accordance with the invention. The disk drive 2 conventionally includes a base casting 4 made from cast aluminum or other suitable material. A cover 5 is removably mounted thereto via a hermetic seal (not shown). The base casting 4 mounts a conventional spindle drive motor 6 having an associated drive spindle 8. The drive spindle 8 carries a stacked array of disks 10 for high speed rotation therewith. The disks 10 are made from a suitable material of a type usually found in magnetic disk drive assemblies. In particular, the disks 10 may be formed from an aluminum or glass substrate with appropriate coatings being applied thereto such that at least one, and preferably both, of the upper and lower surfaces of the disks are magnetically encodable and aerodynamically configured for high speed interaction with a read/write transducer (described below).

Data access to the disk 10 is achieved with the aid of an actuator 12 that is mounted for rotation about a stationary pivot shaft 14. The actuator 12 includes rigid actuator arms 16 that each carry one or two flexible suspensions 18. Each suspension 18 supports an air bearing slider 20 having a read/write transducer 22. The transducer 22 (sometimes referred to as a "transducing head") is an integrated device that includes a magnetic write element (sometimes referred to as a "write head") and a magnetic read element (sometimes referred to as a "read head"). The write element conventionally includes an inductive yoke structure and the read element conventionally includes any of various species of magnetoresistive sensor.

There is preferably one transducer 22 associated with each of the upper and lower surfaces of the disks 10 (see FIG. 2), such that each disk surface is available for data storage. The transducers 22 are positionable to read and write data anywhere on the disk surfaces by pivoting the actuator 12 about the pivot shaft 14. The pivotal motion of the actuator 12 causes the actuator arms 16 to sweep the suspensions 18 across the disk surfaces. This in turn causes the sliders 20 with their mounted transducers 22 to move generally radially from one concentric data track to another. To facilitate pivotal movement of the actuator 12, the actuator conventionally includes a voice coil motor winding 24 (see FIGS. 2 and 3) that is driven by a pair of motor magnets 25 (see FIG. 2).

When the disk drive 2 is powered on, the disks 10 spin up to a desired rotational speed, such as 7400 rpm, 10,000 rpm or higher. This causes an upward air bearing force to develop between the disk surfaces and the sliders 20. This upward air bearing force is counteracted by the downward gram loading force provided by the suspensions 18. If the suspensions 18 are properly fabricated, their gram loading force will enable the transducers 22 to fly very closely above the disk surfaces, allowing high density data recording.

Data recorded on the disks 10 is read by the read head elements of the transducers 22 and processed into readback signals by signal amplification and processing circuitry (not shown) that is conventionally located on the actuator arms 16. The readback signals, which carry both data and transducer position control information, are sent to the disk drive controller, shown diagrammatically at 26, for conventional processing. The controller 26 also generates write data signals during data write operations. The write data signals are delivered via circuitry carried by the actuator arms 16 and suspensions 18 to the write head elements of the transducers 22 for writing data onto the disks 10.

It will be appreciated that the foregoing description of the disk drive 2 is exemplary in nature, and that many other design configurations would be possible while still utilizing the suspension load beam manufacturing method of the invention.

Figure 4:
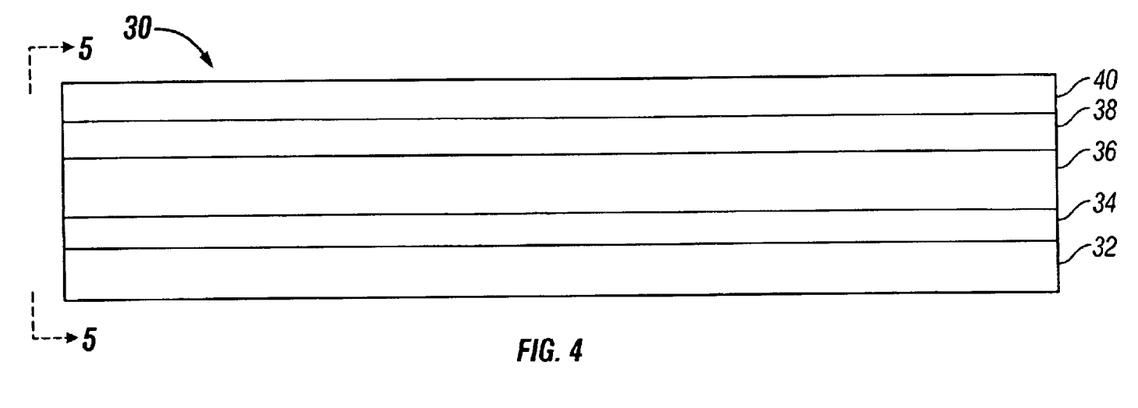
FIG. 4 is a side elevational view of a composite laminate structure that has been fabricated for use in forming a suspension in accordance with the invention.
Figure 5:
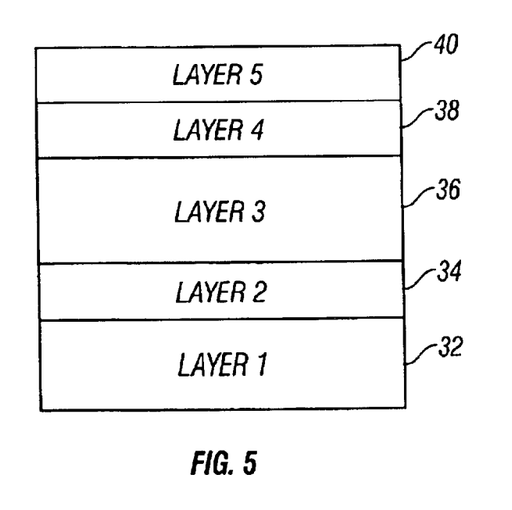
FIG. 5 is an enlarged edge view of the laminate structure in FIG. 4 taken in the direction of line 5—5 in FIG. 4.

Turning now to FIGS. 4–9, an exemplary method will be described for manufacturing a disk drive suspension, such as the suspension 18 of FIGS. 1–3. According this method, fabrication begins with the formation of a composite laminate structure 30 having five layers, as shown in FIG. 4. A first layer 32 forms the bottom of the laminate structure 30. A second layer 34 is disposed over the first layer. A third layer 36 is disposed over the second layer 34. A fourth layer 38 is disposed over the third layer 36. A fifth layer 40 is disposed over the fourth layer 38. Note that the first through fifth layers 32-40 need not necessarily be the only layers forming the laminate structure 30. Thus, there could be additional layers below the first layer 32, above the fifth layer 40, or between any of the first through fifth layers 32-40. Notwithstanding these additional layers, the laminate structure 30 will always contain the first through fifth layers 32–40, and these layers will be positioned relative to each other according to the order shown in FIG. 4. In other words, the second layer 34 will be disposed between the first layer 32 and the third layer 36, and the fourth layer 38 will be disposed between the third layer 36 and the fifth layer 40.

A variety of materials may be used to form the first through fifth layers 32 through 40 based on the respective roles they will play in the suspension to be fabricated from the laminate structure 30. As described in more detail below, the first layer 32 is intended to function as the main load bearing layer of a mount plate and a load beam functional end. It is thus preferably made from a material selected from the group consisting of structural load bearing materials, including but not limited to stainless steel, copper, and glass/ceramic materials. The second layer 34 can function in a variety of alternative capacities, including as an electrically insulating layer, an electrically conductive (ground plane) layer, and a damping layer. It is thus preferably made from a material selected from the group consisting of electrically insulating materials, electrically conductive materials and damping materials, including but not limited to polyimides, copper, aluminum, and viscoelastic polymers. The third layer is intended to function as the principal load bearing layer of a flexure. It is thus preferably made from a material selected from the group consisting of structural load bearing materials, including but not limited to stainless steel and copper. The fourth layer is intended to function as a flexure insulative layer and/or a damping layer. It is thus preferably made from a material selected from the group consisting of electrically insulating materials and damping materials, including but not limited to polyimides and viscoelastic polymers. The fifth layer is intended to function as a flexure electrical lead layer. It is thus preferably made form a material selected from the group consisting of electrically conducting materials.

The laminate structure 30 can be formed in a variety of ways, depending on the materials used for the first through fifth layers 32–40. For example, all layers made of metal can be introduced into the laminate structure 30 as individually prefabricated, roll-formed sheets. All layers made from polymeric material, such as polyimides or viscoelastic damping materials, (namely, the second and fourth layers 34 and 38), can be coated in liquid form onto an adjacent pre-fabricated metal layer. The foregoing layer structures can then be laminated together using a conventional lamination process.

The principles of the invention will now be further presented with reference to an exemplary suspension 100 that has been fabricated according to the method described above. Note that the suspension 100 has a configuration that has been selected for purposes of illustration only and not by way of limitation. Other configurations would also be possible.

Figure 6:
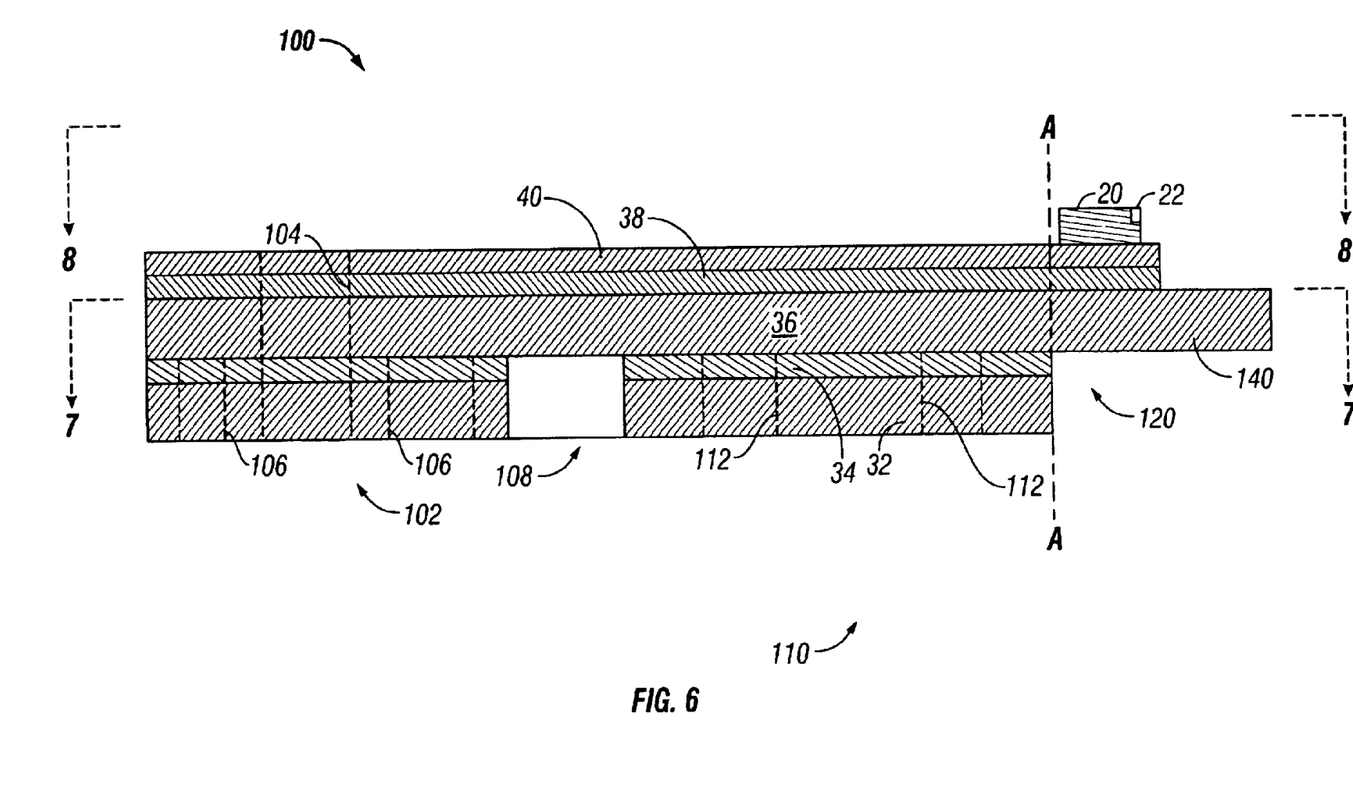
FIG. 6 is a side elevational view of an exemplary suspension made from the laminate structure of FIG. 4.
Figure 7:
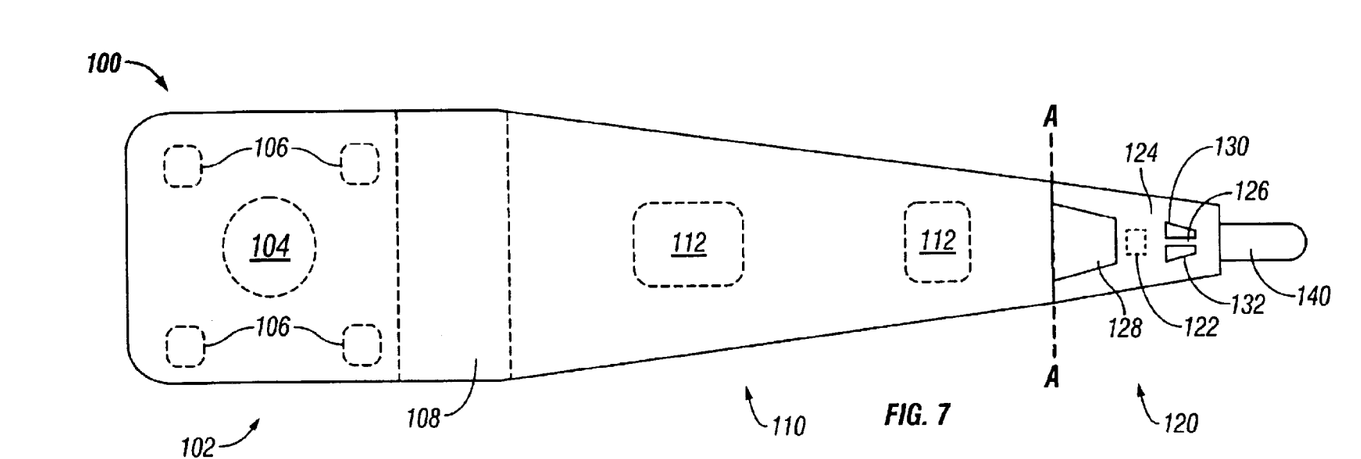
FIG. 7 is a cross-sectional view taken along line 7—7 in FIG. 6.
Figure 8:
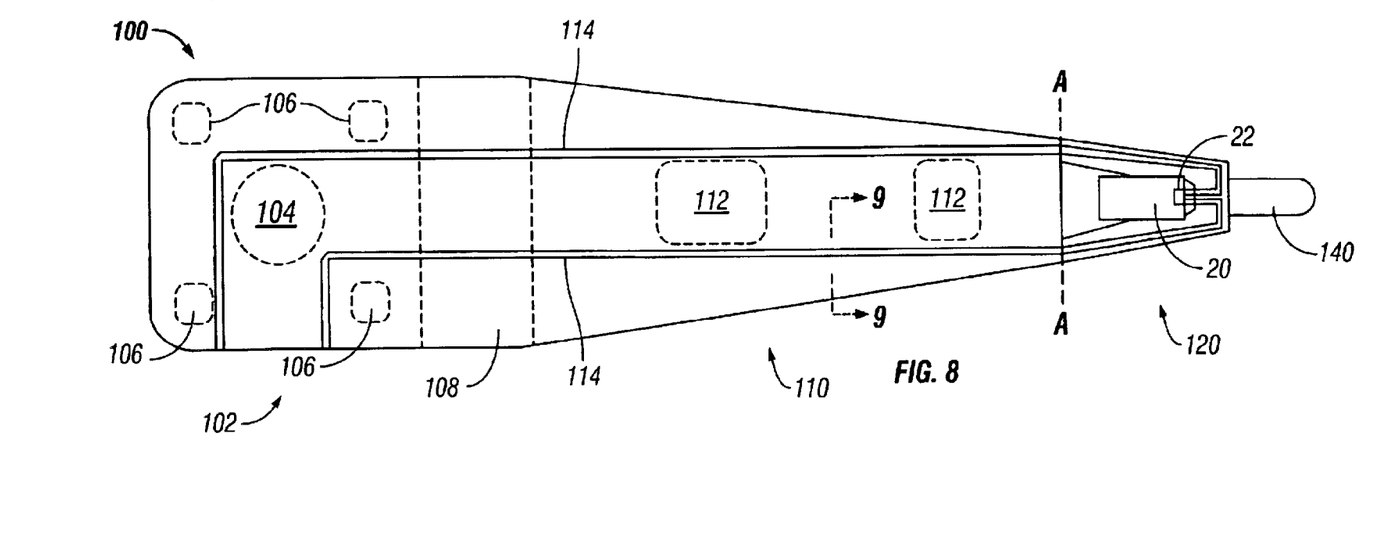
FIG. 8 is a plan view of the suspension of FIG. 4 taken in the direction of lines 8—8 in FIG. 4.
Figure 9:
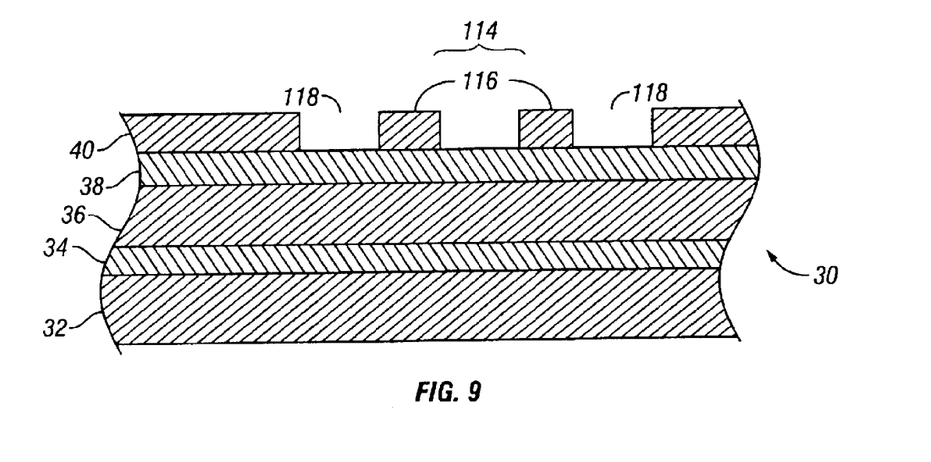
FIG. 9 is a partial cross-sectional view taken along line 9—9 in FIG. 8.

Beginning at the left hand side of FIGS. 6–8, the suspension 100 is shown as including a mount plate 102 that is adapted for mounting the suspension to one of the actuator arms 16 of FIGS. 1–3. The mount plate 102 is designed to act as rigid load bearing structure and thus comprises at least the first layer 32, the second layer 34 and the third layer 36. Recall that the first layer 32 of the laminate structure 30 is a structural load bearing layer preferably made from a material such as stainless steel, copper or glass/ceramic material. The second layer 34 is either an electrically insulating layer, an electrically conductive (ground plane) layer, or a damping layer preferably made from materials such as polyimides, copper, aluminum, or viscoelastic polymer. The third layer 36 is another structural load bearing layer preferably made from a material such as stainless steel or copper. The first through third layers 32–36 will thus impart a great deal of strength and rigidity to the mount plate 102. For example, exemplary embodiments of the suspension 100 will feature a first layer 32 made from stainless steel, a second layer 34 made from a viscoelastic damping material, and a third layer 36 made from stainless steel or copper.

Note that the mount plate 102 could also comprise one or both of the fourth layer 38 and the fifth layer 40. However, these layers would not be relied on for their structural properties and would usually be present in the mount plate 102 as a matter of manufacturing convenience. In addition, the suspension design may call for the suspension's electrical lead system to be carried substantially across the mount plate 102, as illustrated in FIGS. 6 and 8.

As best shown in FIGS. 7 and 8, the mount plate 102 may be formed with a large attachment aperture 104 that facilitates attachment of the suspension 100 to one of the associated actuator arms 16 by way of a conventional swage or rivet connector 40 (see FIGS. 1–3). The attachment aperture 104 can be formed using a conventional removal process, such as chemical etching. In addition to the attachment aperture 104, the mount plate can be formed with one or more mass reducing pockets 106 (four are shown). The pockets 106 can be formed by removing all or part of the first layer 32 at selected locations using a conventional partial removal process, such as partial chemical etching.

Moving now toward the right in FIGS. 6–8, it will be seen that a load beam hinge 108 is located adjacent to the mount plate 102. The hinge 108 is formed by removing all or part of the first layer 32 and the second layer 34 in a hinge area. Preferably, all of the first and second layers 32 and 34 are removed. This will leave the third through fifth layers 36–40 intact, with the third layer 36 acting as a load bearing member preferably made from stainless steel or copper that has relatively good bending compliance so as to facilitate proper gram loading of the slider 20 and transducer 22 of FIGS. 1–3. As best shown in FIGS. 6 and 8, the fourth and fifth layers 38 and 40 are present in the hinge area to provide electrical lead connections to and from the transducer 22.

Moving now further to the right in FIGS. 6–8, it will be seen that a load beam functional end 110 is formed adjacent to the hinge 108, on the side opposite the mount plate 102. The functional end 110 is designed to act as a relatively stiff load bearing structure that carries the electrical lead elements of the suspension 100 and the slider 20. It comprises at least the third layer 36, the fourth layer 38 and the fifth layer 40, and preferably the first and second layers 32 and 34 as well. Recall that the third layer 36 of the laminate structure 30 is a structural load bearing layer preferably made from a material such as stainless steel or copper. The fourth layer 38 is an electrically insulating layer that may also act as a damping layer and is preferably made from a material such as polyimides or and viscoelastic polymers. The fifth layer 40 is an electrically conductive layer that is patterned to define electrical lead traces. The third through fifth layers 36–40 of the functional end 110 will thus serve to support the slider 20 in an operational position and carry electrical signals to and from the transducer 22. Exemplary embodiments of the suspension 100 will feature a third layer 36 made from stainless steel, a fourth layer 38 made from a polyimide material, and a fifth layer 36 made from copper. Note that the third layer 36 could also be made from copper so as to define a ground plane for the suspension's electrical system.

Although the functional end 110 can be formed with only the third through fifth layers 36–40, it preferably also comprises one or both of the first layer 32 and the second layer 34. It is this configuration that is shown in FIGS. 6–8. The first layer 32, which is preferably made from stainless steel, copper or a glass/ceramic material, imparts additional structural stiffness to the functional end 110. The second layer 34, which is preferably made from aluminum, copper, a polyimide or a viscoelastic damping material, provides additional properties according to the material selected.

As best shown in FIGS. 7 and 8, the functional end 110 may be configured with one or more mass reducing pockets 112 (two are shown). The pockets 112 can be formed by removing all or part of the third layer 36, or the first layer 32 if it is present, at selected locations using a conventional partial removal process, such as partial chemical etching.

Turning now to FIGS. 6 and 8, an electrical lead system is formed on the suspension 100 by selectively patterning the fifth layer 40, which is preferably made from an electrical conductor such as copper, to define electrical lead traces 114 that connect to the transducer 22. As further shown in FIG. 9, the electrical lead traces 114 are defined by first portions 116 of the fifth layer 40 that are created by removing second portions 118 of the fifth layer that electrically isolate the first portions. Partial chemical etching can be used to remove the second portions 118 and thereby electrically isolate the first portions 116.

The functional end 110 can also be configured with a flexure gimbal system 120. The gimbal system 120, which extends to the right of the line A—A in FIGS. 6–8, carries the slider 20 and the transducer 22 in a gimbaled support arrangement. The flexure gimbal system 120 is created by selectively patterning the third layer 36 to form the required structures. In particular, the flexure gimbal system 120 includes a slider attachment area 122 representing the intersection of two gimbaling flexure members 124 and 126 formed in the third layer 36.

The slider attachment area 122 and the gimbaling flexure members 124 and 126 can be formed using three partial etch processes. Initially, a first partial etch process is performed in which the suspension 100 is partially etched to completely remove portions of the first and second layers 32 and 34 that lie to the right of the line A—A, so as to clear space for etching the flexure gimbal system 120 in the third layer 36. A second partial etch process is then performed in which the suspension 100 is etched to selectively remove portions of the fourth and fifth layers 38 and 40 that lie to the right of the line A—A and which are not associated with the electrical lead traces 114. A third partial etch process is then performed in which the third layer 36 is etched to create openings 128, 130 and 132. This defines the gimbaling flexure members 124 and 126, which appear as a T-shaped structure in the third layer 36 when looking from the right side of FIG. 7. As stated, the slider attachment area 122 represents the intersection of the flexure members 124 and 126.

As best shown in FIGS. 7 and 8, the slider attachment area 122 and the gimbaling flexure members 124 and 126 provide a mounting structure for supporting the slider 20 in a gimbaled arrangement. When flexed, the flexure members 124 and 126 will tend to pivot the slider attachment area 122, thereby allowing the slider 20 to pitch and roll during drive operation.

Note that a load/unload tang 140 could also be formed at the right hand end of the suspension 100. This load/unload tang 140 is preferably formed by the third layer 36 after removing the other layers during formation of the flexure gimbal system 120.

Accordingly, a method for manufacturing a weld free high performance laminate suspension has been disclosed. While various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A method of manufacturing a weld free laminate disk drive suspension, comprising:

forming a composite laminate structure having a first layer, a second layer, a third layer, a fourth layer and a fifth layer, said second layer being disposed between said first and third layers and said fourth layer being disposed between said third and fifth layers;

forming a mount plate comprising at least said first, second and third layer;

forming a load beam functional end comprising at least said third, fourth and fifth layers;

forming a hinge in a hinge area between said mount plate and said load beam by removing all or part of said first and second layers in said hinge area;

forming a flexure gimbal system comprising said third, fourth and fifth layers, but not said first layer; and forming an electrical lead system comprising said fifth layer.

2. A method in accordance with claim 1 wherein said hinge is formed by removing all of said first and second layers in said hinge area.

3. A method in accordance with claim 1 wherein said electrical lead system is defined by first portions of said fifth later that are formed by removal of second portions of said fifth layer.

4. A method in accordance with claim 1 wherein said flexure gimbal system is formed without said second layer.

5. A method in accordance with claim 1 wherein said flexure gimbal system includes a slider attachment area and gimbaling flexure members comprising said third layer.

6. A method in accordance with claim 1 wherein said first layer is made from a material selected from the group consisting of structural load bearing materials, including but not limited to stainless steel, copper, and glass/ceramic materials.

7. A method in accordance with claim 1 wherein said second layer is made from a material selected from the group consisting of electrically insulating materials, electrically conductive materials and damping materials, including but not limited to polyimides, copper, aluminum, and viscoelastic polymers.

8. A method in accordance with claim 1 wherein said third layer is made from a material selected from the group consisting of structural load bearing materials, including but not limited to stainless steel and copper.

9. A method in accordance with claim 8 wherein said fourth layer is made from a material selected from the group consisting of electrically insulating materials and damping materials, including but not limited to polyimides and viscoelastic polymers.

10. A method in accordance with claim 1 wherein said fifth layer is made from a material selected from the group consisting of electrically conducting materials.

11. In a disk drive suspension assembly mounting a transducer-carrying slider and a weld free laminate suspension, said suspension comprising:

a composite laminate structure having a first layer, a second layer, a third layer, a fourth layer and a fifth layer, said second layer being disposed between said first and third layers and said fourth layer being disposed between said third and fifth layers;

a mount plate comprising at least said first, second and third layers;

a load beam functional end comprising at least said third, fourth and fifth layers;

a hinge defined in a hinge area between said mount plate and said load beam by removal of all or part of said first and second layers in said hinge area;

a flexure gimbal system comprising said third, fourth and fifth layers, but not said first layer; and an electrical lead system comprising said fifth layer.

12. A suspension assembly in accordance with claim 11 wherein said hinge is defined by removal of all of said first and second layers in said hinge area.

13. A suspension assembly in accordance with claim 11 wherein said electrical lead system is defined by first portions of said fifth layer that are created by removal of second portions of said fifth layer.

14. A suspension assembly in accordance with claim 11 wherein said flexure gimbal system does not include said second layer.

15. A suspension assembly in accordance with claim 11 wherein said flexure gimbal system includes a slider attachment area and gimbaling flexure members comprising said third layer.

16. A suspension assembly in accordance with claim 11 wherein said first layer is made from a material selected from the group consisting of structural load bearing materials, including but not limited to stainless steel, copper, and glass/ceramic materials.

17. A suspension assembly in accordance with claim 11 wherein said second layer is made from a material selected from the group consisting of electrically insulating materials, electrically conductive materials and damping materials, including but not limited to polyimides, copper, aluminum, and viscoelastic polymers.

18. A suspension assembly in accordance with claim 11 wherein said third layer is made from a material selected from the group consisting of structural load bearing materials, including but not limited to stainless steel and copper.

19. A suspension assembly in accordance with claim 11 wherein said fourth layer is made from a material selected from the group consisting of electrically insulating materials and damping materials, including but not limited to polyimides and viscoelastic polymers.

20. A suspension assembly in accordance with claim 11 wherein said fifth layer is made from a material selected from the group consisting of electrically conducting materials.

21. In a disk drive having a housing, a rotatable magnetic recording medium in the housing, an actuator carrying an actuator arm, a weld free laminate suspension, a slider and a read/write transducer, said suspension comprising:

a composite laminate structure having a first layer, a second layer, a third layer, a fourth layer and a fifth layer, said second layer being disposed between said first and third layers and said fourth layer being disposed between said third and fifth layers;

a mount plate comprising at least said first, second and third layers;

a load beam functional end comprising at least said third, fourth and fifth layers;

a hinge defined in a hinge area between said mount plate and said load beam by removal of all or part of said first and second layers in said hinge area;

a flexure gimbal system comprising said third, fourth and fifth layers, but not said first layer; and an electrical lead system comprising said fifth layer.

22. A disk drive in accordance with claim 21 wherein said hinge is defined by removal of all of said first and second layers in said hinge area.

23. A disk drive in accordance with claim 21 wherein said electrical lead system is defined by first portions of said fifth layer that are created by removal of second portions of said fifth layer.

24. A disk drive in accordance with claim 21 wherein said flexure gimbal system does not include said second layer.

25. A disk drive in accordance with claim 21 wherein said flexure gimbal system includes a slider attachment area and gimbaling flexure members comprising said third layer.

26. A disk drive in accordance with claim 21 wherein said first layer is made from a material selected from the group consisting of structural load bearing materials, including but not limited to stainless steel, copper, and glass/ceramic materials.

27. A disk drive in accordance with claim 21 wherein said second layer is made from a material selected from the group consisting of electrically insulating materials, electrically conductive materials and damping materials, including but not limited to polyimides, copper, aluminum, and viscoelastic polymers.

28. A disk drive in accordance with claim 21 wherein said third layer is made from a material selected from the group consisting of structural load bearing materials, including but not limited to stainless steel and copper.

29. A disk drive in accordance with claim 21 wherein said fourth layer is made from a material selected from the group consisting of electrically insulating materials and damping materials, including but not limited to polyimides and viscoelastic polymers.

30. A disk drive in accordance with claim 21 wherein said fifth layer is made form a material selected from the group consisting of electrically conducting materials.

* * * * *

UNITED STATES PATENT AND TRADEMARK OFFICE
CERTIFICATE OF CORRECTION

PATENT NO.   : 6,785,094 B2
DATED        : August 31, 2004
INVENTOR(S)  : Arya et al.

It is certified that error appears in the above-identified patent and that said Letters Patent is hereby corrected as shown below:

Column 8,
Line 33, change "later" to -- layer --.

Signed and Sealed this

Eighteenth Day of January, 2005

JON W. DUDAS
*Director of the United States Patent and Trademark Office*

UNITED STATES PATENT AND TRADEMARK OFFICE
CERTIFICATE OF CORRECTION

PATENT NO. : 6,785,094 B2
DATED : August 31, 2004
INVENTOR(S) : Satya Prakash Arya et al.

It is certified that error appears in the above-identified patent and that said Letters Patent is hereby corrected as shown below:

Title page,
Item [73], Assignee, delete:
"Hitachi Global Storage Technologies (NL)" and substitute therefor:
-- Hitachi Global Storage Technologies Netherlands, B.V., Amsterdam (NL) --

Signed and Sealed this

Third Day of May, 2005

JON W. DUDAS
*Director of the United States Patent and Trademark Office*